United States Patent [19]

Quayle

[11] Patent Number: 4,628,245
[45] Date of Patent: Dec. 9, 1986

[54] MULTIPOLAR EXCITATION SYSTEMS

[75] Inventor: George P. Quayle, Preston, England

[73] Assignee: Associated Electrical Industries Limited, England

[21] Appl. No.: 705,334

[22] PCT Filed: Jun. 6, 1984

[86] PCT No.: PCT/GB84/00195
§ 371 Date: Feb. 13, 1985
§ 102(e) Date: Feb. 13, 1985

[87] PCT Pub. No.: WO85/00078
PCT Pub. Date: Jan. 3, 1985

[30] Foreign Application Priority Data

Jun. 15, 1983 [GB] United Kingdom ................ 8316283

[51] Int. Cl.[4] .............................................. H02P 9/00
[52] U.S. Cl. ................................. 322/32; 310/68 D; 310/165; 310/198; 318/773
[58] Field of Search ............. 310/160, 161, 165, 68 R, 310/68 D, 198–208, 180, 184; 322/32; 318/773

[56] References Cited

U.S. PATENT DOCUMENTS

| | | | |
|---|---|---|---|
| 3,361,953 | 1/1968 | Neval | 310/180 |
| 3,479,543 | 11/1969 | Drexler | 310/198 |
| 3,577,002 | 5/1971 | Hall | 310/68 D |
| 3,858,107 | 12/1974 | Yarrow | 310/160 |
| 4,004,211 | 1/1977 | Takao | 310/184 |
| 4,024,455 | 5/1977 | Yarrow | 310/160 |
| 4,338,534 | 7/1982 | Broadway | 310/198 |
| 4,454,465 | 6/1984 | Greene | 310/184 |
| 4,459,502 | 7/1984 | El-Antably | 310/184 |
| 4,477,767 | 10/1984 | Cotzas | 310/198 |

FOREIGN PATENT DOCUMENTS

| | | |
|---|---|---|
| 953636 | 12/1956 | Fed. Rep. of Germany . |
| 2005679 | 8/1971 | Fed. Rep. of Germany . |
| 8403 | of 1905 | United Kingdom . |
| 167242 | 7/1921 | United Kingdom . |
| 226329 | 12/1924 | United Kingdom . |
| 296481 | 9/1928 | United Kingdom . |
| 361369 | 11/1931 | United Kingdom . |

Primary Examiner—R. Skudy
Attorney, Agent, or Firm—Kirschstein,Kirschstein,Ottinger & Israel

[57] ABSTRACT

A D.C. excited rotor winding arrangement for a dynamoelectric machine comprises at least one closed loop (1,2,3) of three or more series-connected winding sections (10,11,12,13,16,17,18,19,20,21,22,23) with at least three current-supply terminals (ABCD) at their interconnections. At least one pair of adjacent winding sections (10,13; 11,12) generate opposite magnetic poles when fed in parallel with current from their common supply terminal (such terminals are designated "odd", as opposed to "even" terminals which are each associated with two poles of the same sense) and the pole number is varied by switching the current supply from "odd" to "even" terminals or vice versa. Preferably the winding arrangement comprises a plurality of series-connected closed loops (1) of four winding sections interconnected at two odd (B5, D5) and two even (A5, C5) terminals. Preferably the winding arrangement is fed with current from one of a plurality of rotating rectifiers (4,6,7) according to the pole number required.

7 Claims, 8 Drawing Figures

MULTIPOLAR EXCITATION SYSTEMS

BACKGROUND OF THE INVENTION

1. Field of the Invention

The present invention relates to D.C. excitation systems for A.C. multipolar dynamoelectric machines and is particularly concerned with brushless excitation systems arranged to produce variable pole numbers in the rotor windings of such machines.

2. Description of the Related Art

In many cases it is possible to vary the speed of a motor or the frequency of an alternator by varying the pole number. However, known arrangements for generating variable pole numbers require relatively complicated switching arrangements and/or require large numbers of slip ring connections.

SUMMARY OF THE INVENTION

1. Objects of the Invention

An object of the present invention is to alleviate such disadvantages.

2. Features of the Invention

According to one aspect of the present invention, a variable pole number D.C.—excited winding arrangement for a dynamoelectric machine comprises a closed loop of three or more series-connected rotor winding sections and at least first, second and third current-supply terminals at respective interconnections of said winding sections, the pair of winding sections common to said first current supply terminal being wound so as to generate magnetic poles of opposite senses when fed in parallel and the pair of winding sections common to said second current supply terminal being wound so as to generate magnetic poles of opposite senses when fed in series, current supply means comprising respective first and second rotating rectifiers connected to independently energisable exciter windings being provided for energising said winding sections via either said first or said second current supply terminal according to the exciter winding which is energised, so as to reverse the current through at least one of said winding sections and thereby vary the pole number.

The winding arrangement may comprise a plurality of interconnected loops of three or more series-connected winding sections.

Each common terminal is designated "even" or "odd" according to whether the pair of winding sections to which it is common generate magnetic poles at the rotor-stator interface of the same or of opposite senses when fed in parallel from the common terminal in question.

The or each loop may incorporate four or more winding sections defining at least one odd terminal and at least one even terminal, the current supply means being arranged to feed the or each said loop via either the odd terminal or the even terminal according to the pole number required.

Two or more winding sections may be wound on a common core so as to generate a single magnetic pole at the rotor-stator interface. Said two or more winding sections may be incorporated in the same or in different loops.

Additional groups of series or parallel-connected winding sections may be connected in series with the or each loop of winding sections.

Said exciter windings may be incorporated in a common exciter and magnetically linked to two or more independently exciter field windings so disposed that each exciter winding is exclusively energisable by a respective one of said field windings. Said field windings are preferably stator windings.

According to another aspect of the invention a variable pole number D.C.—excited rotor winding arrangement for dynamoelectric machine comprises a plurality of closed loops of rotor winding sections, at least two of said loops being connected in series and current supply means comprising respective first and second rotating rectifiers connected to independently energisable exciter windings, wherein said current supply means is adapted to energise different pairs of current supply terminals of the rotor winding sections according to the pole number required.

Each loop may incorporate four winding sections.

Two or more winding sections may be wound on a common core so as to generate a single magnetic pole at the rotor-stater interface. Said two or more rotor winding sections may be incorporated in the same or in different loops.

The invention includes within its scope dynamoelectric machines incorporating winding arrangements as set out hereinabove.

BRIEF DESCRIPTION OF THE DRAWINGS

The invention will become clearer on consideration of FIGS. 1 to 3 of the accompanying drawings, of which:

FIG. 1 is a collection of schematic diagrams of three different loops of winding sections for use in one arrangement in accordance with the invention; wherein

DESCRIPTION OF THE PREFERRED EMBODIMENTS

Figure 1A:
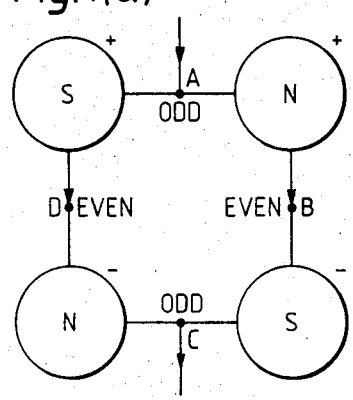
FIG. 1(a) shows a loop of four winding sections having two odd and two even terminals with current supply and exit at the odd terminals.
Figure 1B:
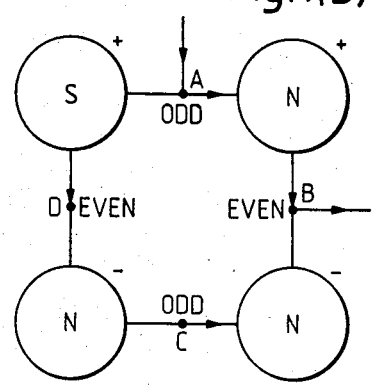
FIG. 1(b) shows the loop of FIG. 1(a) with the current exit shifted to an even terminal.
Figure 1C:
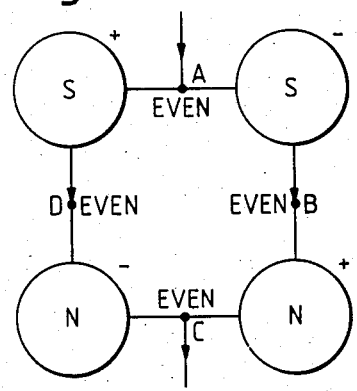
FIGS. 1(c) and 1(d) show a loop having four even terminals.
Figure 1D:
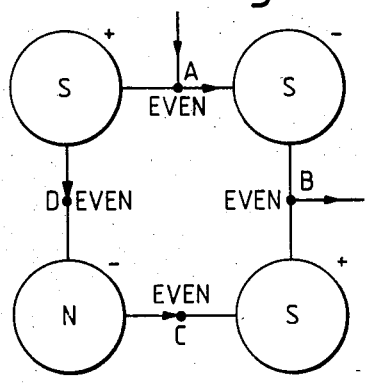
Figure 1E:
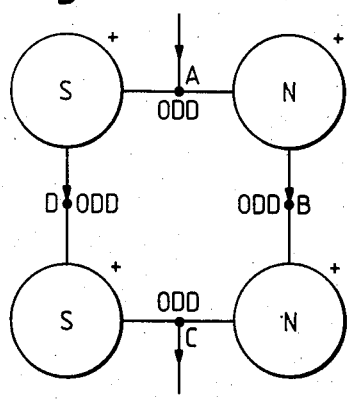
FIGS. 1(e) and 1(f) show a loop having four odd terminals.
Figure 1F:
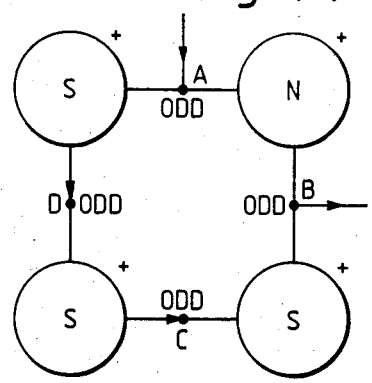

Referring to FIG. 1, three types of closed loops, namely (a) and (b); (c) and (d), and (e) and (f) are shown. Each loop consists of four serially interconnected radially directed winding sections distributed about a rotor circumference which are interconnected at four terminals A, B, C, and D.

Each winding section is labelled + or − according to whether it generates a north pole or a south pole when the current flows clockwise between the adjacent terminals (i.e. A to B, B to C, C to D or D to A). Reading clockwise from terminal A, the three types of loop may thus be denoted +−−+, −+−+, and ++++. Each type of loop is shown fed from alternative pairs of terminals, namely A to C (diagrams (a) (c) and (e)) and A to B (diagrams (b), (d) and (f)). The resulting N or S magnetic poles at the rotor-stator interface are indicated. It will be appreciated that each loop of winding sections will in general additionally generate a set of magnetic poles of opposite senses to those indicated, since each winding section will generate two opposite poles. For the sake of simplicity, only one set of poles, namely the set of adjacent poles at the rotor-stator interface, has been indicated in each of parts (a) to (f) of FIG. 1. The (omitted) poles of the other set may either combine with poles produced by other loops of winding sections or will cancel out in the rotor or stator laminations. In either case they will not affect the pole number. It will be seen that the common terminal of adjacent winding sections will be "odd" (as defined above) if they are both positive or both negative but will otherwise be "even" (as defined above).

The change in pole number and distribution resulting from the change in current feed will now be examined for each of the three types of loop, adjacent N or adjacent S poles being considered as single N or S poles.

Between diagrams (a) and (b) the current exit rail is shifted from terminal C(odd) to terminal B(even), giving a change from four poles to two poles. Between diagram (c) and diagram (d) there is no change in pole number (two poles in each case) but the poles are rotated clockwise. Between diagram (e) and diagram (f) there is similarly no change in pole number (two poles) but the poles are rotated anticlockwise. The fourth type of loop, namely +++−, is not considered here but can similarly be shown to generate two poles which are rotated anticlockwise when the current feed is changed from AC to AB.

In general it can be shown that for any number of winding sections greater than three, no change in pole number is achieved by shifting a current supply or current exit rail from an odd to an odd or from an even to an even terminal, and that two extra poles will be created by shifting a current supply or current exit from an even to an odd terminal (compare diagrams (a) and (b)). In a loop of five or more winding sections the changes in pole number achievable by successively shifting a current supply or current exit rail from an odd to an even terminal (or vice versa) are additive—hence the maximum change in pole number obtainable by shifting two current supply rails between terminals of such a loop of interconnected winding sections is 2+2=4. This applies irrespective of the configuration of the winding sections. For example the axes of the winding sections may be tangential to the rotor circumference or they may be radial.

A closed loop of four windings with means for feeding current to either one or other of the pairs of opposite terminals is particularly advantageous for use in accordance with the invention because a variety of symmetrical pole distributions with balanced current in the windings may be obtained if the windings have equal resistances. More elaborate pole distributions than those shown in FIG. 1 may be obtained by employing a number of loops and suitably positioning the windings of each loop on the rotor circumference and by combining the magnetic fields of two or more windings from the same or different loops. It will be understood that the invention includes within its scope winding arrangements utilising loops of five, six or more winding sections since the pole number contribution of each such loop can be changed by up to for poles, as noted above.

Figure 2:
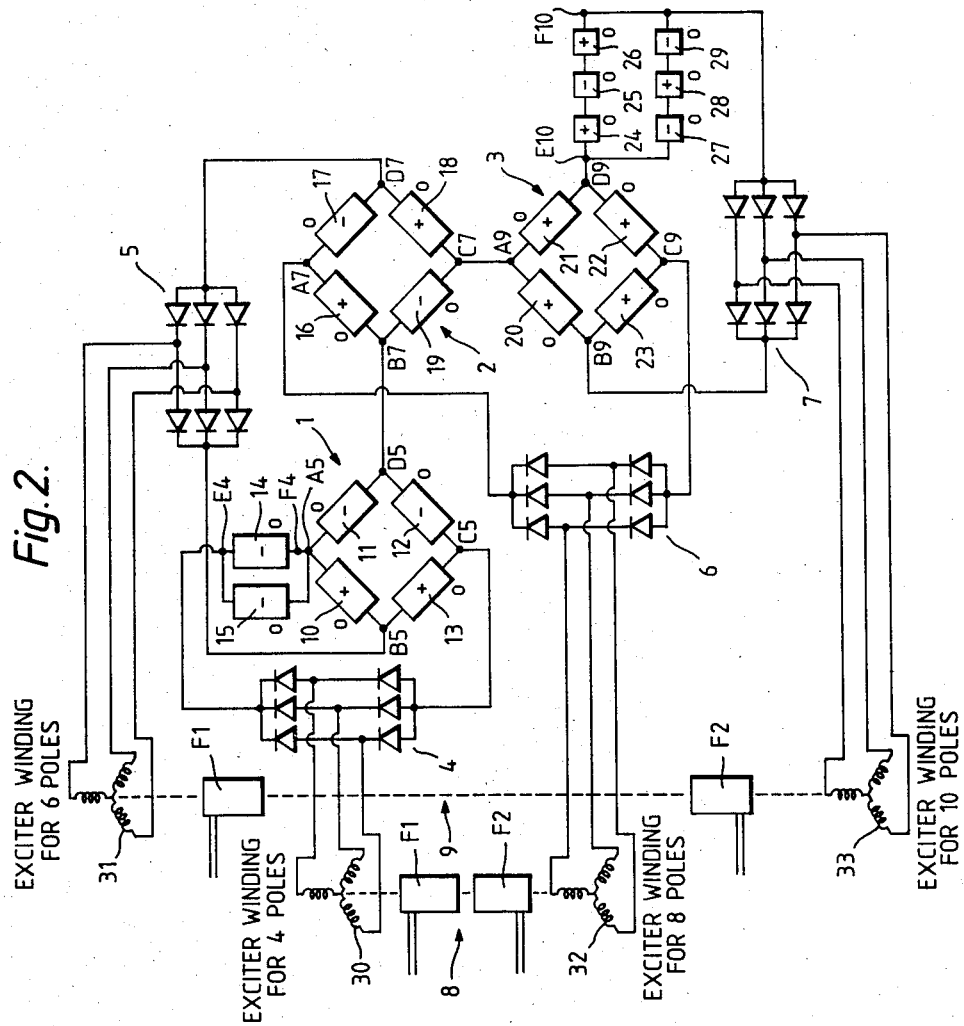
FIG. 2 is a schematic circuit diagram showing by way of example a variable pole number rotor winding arrangement in accordance with the invention.
Figure 3:
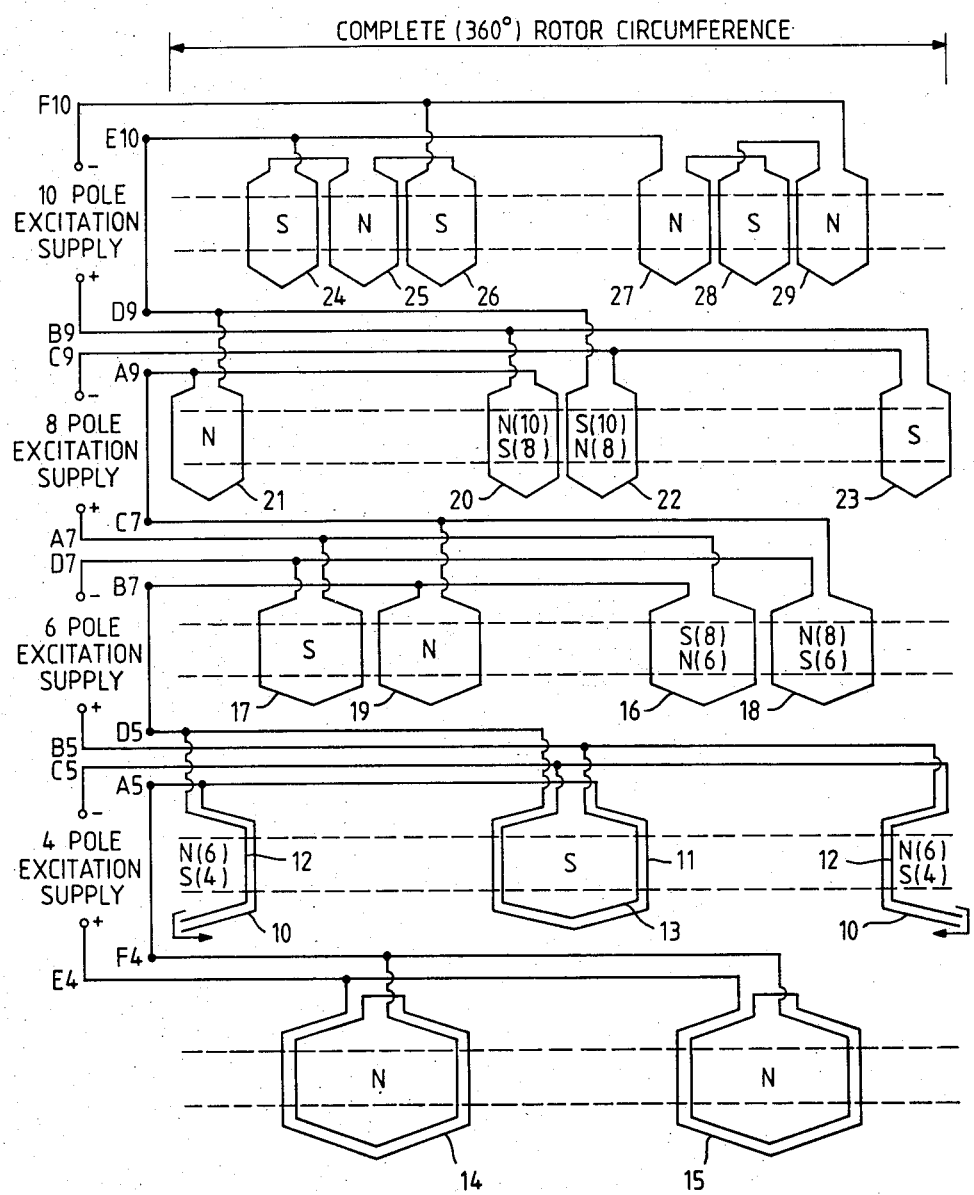
FIG. 3 is a schematic diagram representing the disposition of the winding sections of FIG. 2 about the rotor circumference.

FIGS. 2 and 3 show a 4, 6, 8 or 10 pole rotor winding arrangement in accordance with the invention for an alternator.

The rotor winding consists of three groups of windings 1, 2 and 3. Group 1 consists of a loop of four winding sections 10, 11, 12 and 13 connected between terminals A5, B5, C5 and D5, and two parallel-connected winding sections 14 and 15 connected in series with the loop between terminals E4 and F4; group 2 consists of a loop of four winding sections 16, 17, 18 and 19 connected between terminals A7, B7, C7 and D7, and group 3 consists of a loop of four winding sections 20, 21, 22 and 23 connected between terminals A9, B9, C9 and D9 and two groups of three winding sections 24, 25 and 26 and 27, 28 and 29 connected in parallel between terminals E10 and F10. The windings between terminals E4, F4 and E10, F10 are arranged to have appropriate resistances to equalise the electrical loads on rotating rectifiers 4, 5, 6 and 7. The distribution of the three groups of winding sections (all of whose axes are radial) round the rotor circumference is shown schematically in FIG. 3, the horizontal axis representing distance round the rotor circumference and the vertical axis representing distance in the radial direction. The layers of winding sections are shown separated for the sake of clarity. Groups of winding sections 1, 2 and 3 are each arranged to be D.C. excited at either of two pairs of terminals from shaftmounted three-phase bridge rectifiers 4, 5, 6 and 7. The winding sections in each loop are of equal resistance so that none of the e.m.f. generated at the D.C. terminals of any one bridge rectifier is distributed across the D.C. terminals of any of the other bridge rectifiers. A similar effect may be achieved by making one pair of adjacent windings each of resistance r and the other pair of adjacent windings in the loop of resistance R, where r≠R. Field winding F1 produces 12 stator poles and field winding F2 produces 24 stator poles in the exciter—these exciter stator pole options all result in D.C. at the bridge reftifiers and are not to be confused with the basic pole number options of the invention. The exciter field and rotor windings are arranged in a known manner so that each exciter rotor winding is energisable by one field winding exclusively. Exciter 8 is provided with two sets of three phase rotor windings 30 and 32 for generating four and 8 poles respectively in the rotor winding of the alternator according to whether its field winding F1 or F2 is energised, winding 30 being fully pitched to 12 poles and winding 32 being fully pitched to 24 poles. Similarly exciter 9 is provided with two sets of rotor windings 31 and 33 energisable by its field windings F1 and F2 respectively for generating six and ten poles respectively in the alternator rotor winding. Windings 31 and 33 are pitched to 12 and 24 poles respectively. Each exciter winding 30, 31, 32 and 33 is independently excitable according to the particular exciter field winding which is energised, so that four, six, eight or ten poles may be generated in the rotor winding of the alternator.

The above mentioned four, six, eight or ten poles are generated in a symmetrical fashion around the rotor circumference of the alternator, as can be seen from FIG. 3. The N and S poles in FIG. 3 (which are the poles at the outer ends of the winding sections) are marked O in FIG. 2. The + and − notation of FIG. 1 is used in FIG. 2, and it will be seen that loop (10, 11, 12, 13) is similar to that shown in FIGS. 1(a) and (b) and that loops (16, 17, 18, 19) and (20, 21, 22, 23) correspond to those shown in FIGS. 1(c) and (d) and FIGS. 1(e) and (f) respectively, except that the D.C. supply can be transferred from terminal A to terminal D, as well as from terminal C to terminal B. Winding sections 10 and 12 are combined on a common yoke so as to produce a common pole at the rotor-stator interface (N in the case of 6 poles and S in the case of 4 poles) and winding sections 11 and 13 are also combined to produce a common S pole (FIG. 3).

In accordance with the invention, winding sections 16, 18, 20 and 22 generate either N or S poles according to the pair of terminals at which the rotor winding is excited (and hence according to which exciter winding 30, 31, 32, 33 is excited). It can be seen that excitation at terminals E4 and C5 generates four poles at winding sections (10 and 12), 14, (11 and 13) and 15; excitation at terminals B5 and D7 generates 6 poles at winding sections (10 and 12), 17, 19, (11 and 13) 16 and 18; excitation at terminals A7 and C9 generates eight poles at winding sections 21, 17, 19, 20, 22, 16, 18 and 23; and that excitation at terminals B9 and F10 generates ten poles at windings 21, 24, 25, 26, 20, 22, 27, 28, 29 and 23. The winding sections may have their axes radially aligned as on conventional alternator rotors, or other orientations (e.g. tangential axes) may be used.

It will be appreciated that the two aspects of the invention illustrated in the embodiment of FIGS. 2 and 3 involve the use of loops of winding sections in slightly different ways to achieve the two distinct advantages:

(a) by disposing the winding sections of a loop so as to provide at least one "even" and at least one "odd" terminal in the loop, the pole number contribution of that loop can be varied by transferring the D.C. excitation from an "even" to an "odd" terminal whilst keeping all the winding sections energised, so that no winding sections in the loop are redundant, whatever the pole number;

(b) by utilising two or more series-connected closed loops of winding sections and arranging for the resistances of the winding sections in each loop to be appropriately balanced, separate independent D.C. supplies may be connected permanently to respective pairs of opposite terminals of the loops and energised individually according to the required pole number, no high power switching arrangements being required.

A compact efficient winding arrangement results, whose pole number can be varied simply be controlling low power exciter field windings.

I claim:

1. A variable pole number D.C. excited rotor winding arrangement for a dynamoelectric machine, comprising:
   (i) a closed loop of at least three series-connected rotor winding sections;
   (ii) at least first, second and third current supply terminals at respective interconnections of said winding sections;
   (iii) a first pair of said winding sections wound for generating magnetic poles of opposite senses when fed in parallel, said first pair of winding sections being common to said first current supply terminal;
   (iv) a second pair of said winding sections wound for generating magnetic poles of opposite senses when fed in series, said second pair of winding sections being common to said second current supply terminal;
   (v) current supply means comprising:
      (a) independently energizable first and second exciter windings for energizing said winding sections via said first and said second current supply terminals respectively,
      (b) respective first and second rotating rectifiers connected to said exciter windings; said current supply means reversing the current through at least one of said winding sections, according to the exciter winding which is energized, and thereby varying the pole number.

2. A winding arrangement according to claim 1, wherein said current supply means comprises:
   (i) one exciter winding connected via rectifying means to said first terminal;
   (ii) another exciter winding connected via rectifying means to said second terminal;
   (iii) two exciter field windings, each said field winding being magnetically linked to both said exciter windings but arranged so that each said field winding can energize one respective exciter winding exclusively.

3. A winding arrangement according to claim 1, comprising a plurality of interconnected closed loops of at least three series-connected winding sections.

4. A winding arrangement according to claim 3, wherein at least one said loop incorporates four of said winding sections.

5. A variable pole number D.C. excited rotor winding arrangement for a dynamoelectric machine, comprising:
   (i) a plurality of closed loops of rotor winding sections, at least two of said loops being connected in series;
   (ii) current supply means comprising:
      (a) two at least independently energizable exciter windings;
      (b) respective rotating rectifiers connected to said exciter windings; said current supply means being adapted for energizing different pairs of current supply terminals of the rotor winding sections according to the pole number required.

6. A winding arrangement according to claim 5, wherein each said loop incorporates four winding sections.

7. A winding arrangement according to claim 6, wherein the axes of said rotor winding sections are disposed radially.

* * * * *